United States Patent [19]

Wood et al.

[11] 4,436,902

[45] Mar. 13, 1984

[54] REMOVAL OF CONTAMINANTS IN LIQUID PURIFICATION

[75] Inventors: William E. Wood; Franklin T. Barber, both of Bartlesville, Okla.

[73] Assignee: Phillips Petroleum Company, Bartlesville, Okla.

[21] Appl. No.: 348,379

[22] Filed: Feb. 12, 1982

[51] Int. Cl.$^3$ ................................................ C08F 6/08
[52] U.S. Cl. .................................... 528/501; 203/73; 203/75; 203/76; 203/77; 203/80; 203/81; 203/82; 203/84; 525/314
[58] Field of Search ....................... 525/314; 528/501; 203/71, 73, 74, 75, 76, 77, 80, 81, 82, 84

[56] References Cited

U.S. PATENT DOCUMENTS

| | | | |
|---|---|---|---|
| 3,081,290 | 3/1963 | Cottle | 528/501 |
| 3,084,149 | 4/1963 | Stevens | 528/501 |
| 3,245,967 | 4/1966 | Moon | 260/88.2 |
| 3,402,124 | 9/1968 | Jones | 203/84 |
| 3,462,347 | 8/1969 | Chapman | 203/82 |
| 3,763,022 | 10/1973 | Chapman | 203/71 |
| 4,278,506 | 7/1981 | Irvin | 528/501 |

*Primary Examiner*—Paul R. Michl

[57] ABSTRACT

A liquid containing a contaminant such as water or polymeric solids is purified. Purification of a liquid containing a contaminant is enhanced by the use of second fractionating column in conjunction with a first fractionating column to recover a portion of the liquid to be purified from the kettle product of the first column. Vapor from a second fractionating column is used to control the total energy input to a first fractionating column.

12 Claims, 1 Drawing Figure

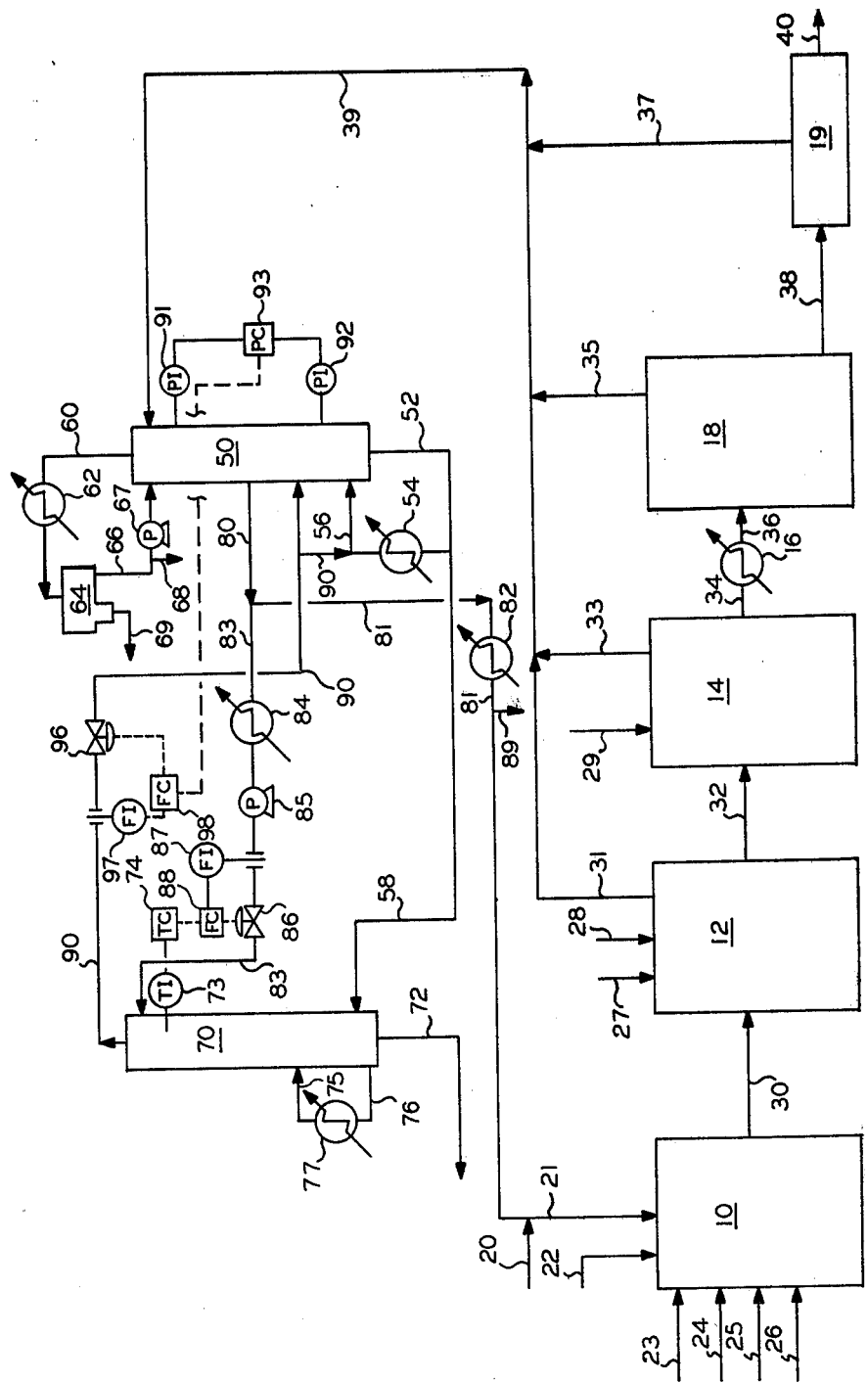

REMOVAL OF CONTAMINANTS IN LIQUID PURIFICATION

BACKGROUND OF THE INVENTION

This invention relates to the purification of a contaminated liquid. In one aspect, this invention relates to the recovery of an organic or inorganic diluent. In another aspect, the invention relates to purification and recycle of a hydrocarbon diluent used in a polymerization process.

Relatively pure liquids are needed for many industrial and domestic uses. For instance, high purity hydrocarbons are used as solvents in the polymerization of other organic compounds. U.S. Pat. No. 2,825,721 by Hogan et al, for instance, discloses that the polymerization of 1-olefins is carried out in the presence of solvents to produce a solid product. A solvent, can be recycled and reused in the polymerizations if it is not otherwise consumed during the reaction. A certain amount of polymeric solids, catalyst residue, and polymerization reaction reagents and by-products are entrained into or dissolved in the solvent during the reaction or during subsequent solvent removal stages. The polymer and other materials contaminate the solvent. These contaminants must be removed if the solvent is to be recycled into the polymerization process. If the contaminants are not so removed, they can build up to an unsatisfactory level and poison subsequent reactions. They may also contaminate the polymer product and damage final product physical characteristics. For instance, certain contaminants which are transferred from an impure solvent to a polymer product cause degradation of the polymer and adversely affect important physical properties such as tensile strength and color.

THE INVENTION

It is thus an object of this invention to provide an improved process for the removal of contaminants from liquids.

Another object of this invention is to provide a process for the purification of a diluent in a polymerization system to permit recycle and reuse of the purified diluent in the polymerization system.

Still another object of this invention is to provide a means for concentrating a contaminant in a liquid purification system effluent stream in order to minimize loss of liquid.

Another object of this invention is to provide an improved process and apparatus for the control of a fractionator.

FIG. 1 is a diagram illustrating a polymerization process utilizing a liquid purification process of this invention.

In accordance with this invention, it has been discovered that purification of a liquid containing contaminants such as water and polymer is enhanced by utilizing a first fractionating column in conjunction with a second fractionating column. The first fractionating column can be used to remove water and other impurities from a liquid to be purified. The first fractionating column produces a kettle product, which contains some of the liquid to be purified. The liquid to be purified that is found in the kettle product of the first fractionating column would in prior process be discarded and lost because the kettle product also contains contaminants. According to this invention, the kettle product of the first fractionating column is not discarded but is directed to a second fractionating column. This second columm recovers most of the liquid from the kettle product of the first fractionating column by vaporizing the liquid and driving it off from the contaminants. The contaminants which are concentrated primarily as solids in the kettle product of the second fractionating column are discarded.

It has also been discovered that vapor from a second fractionating column can be used to provide energy input to a first fractionating column. Also, it has been found that liquid purification and recovery can be improved by using vapor from the second fractionating column to control the boil-up of the first fractionating column. That is, vapor from the second fractionating column can be advantageously used to control the total energy imput to the first fractionating column and can regulate the degree of separation that occurs in the first column.

According to this invention, there is provided a method of and means for increasing the amount of liquid recovered in a liquid purification system. This invention applies to the purification of organic liquids such as paraffins, naphthenes, aromatics, and heterosubstituted organic compounds containing nitrogen, sulfur, oxygen, halogens, etc. Also, this invention applies to the purification of inorganic liquids. Furthermore, this invention applies to the purification of a gas which is liquefied for purification, such as sulfur dioxide or a methane containing natural gas. This invention is particularly applicable to the purification of a liquid containing entrained or solubilized gases or liquids.

In one embodiment of this invention, a process for purifying and recovering a liquid which contains one or more contaminants utilizes two fractionating columns. The contaminated liquid stream is first fed to a first fractionating column where the stream is separated into more than one fraction. In the first fractionating column, the stream is separated into a first overhead fraction, a first sidedraw fraction, and a first bottom or kettle fraction.

The term "overhead fraction" as used herein refers to a fraction taken from an upper zone of a fractionating column. Preferably, overhead fractions are taken from the upper one-third of the fractionating column. The term "kettle fraction" as used herein refers to a fraction taken from a lower zone of a fractionating column. Preferably, a "kettle fraction" is taken from the lower one-third of the fractionating column. The term "side draw fraction" as used herein refers to a fraction taken from a zone of a fractionating column which is neither the upper nor the lower zone. Preferably, a sidedraw fraction is taken from the middle one-third of a fractionating column.

The first overhead fraction comprises substantially one or more contaminants having volatilities which are greater than the volatility of the liquid to be purified. The first overhead fraction can thus be substantially free of the liquid to be purified. A contaminant which has a boiling point less than that of the liquid to be purified is vaporized in the first fractionating column and passes overhead from the first fractionating column. The overhead vapor of the first fractionating column comprising substantially contaminant is preferably condensed and directed to a suitable end use or to disposal.

The first kettle fraction of the first fractionating column is fed to a second fractionating column as a feedstream. The first kettle fraction comprises liquid to be purified and a solid, soluble or relatively high boiling contaminant. That is, the first kettle fraction comprises a contaminant which can boil at a temperature near or greater than the boiling point of the liquid to be purified or can be soluble or insoluble in the liquid to be purified.

The second fractionating column separates the feedstream from the first bottom of the first fractionating column into more than one fraction. In the second fractionating column, the feedstream is preferably separated into a second overhead fraction and a second bottom or kettle fraction.

The second bottom fraction comprises substantially contaminant. A second bottom fraction is preferably moved from the process and put to a suitable end use or is discarded.

In the second fractionating column most of the liquid to be purified is preferably vaporized. The contaminant is preferably not vaporized and is included in the second bottom fraction.

The second overhead fraction of the second fractionating column comprises substantially the liquid to be purified in vapor form. A portion of the second overhead fraction can be condensed and can be directed to the second fractionating column as a reflux stream. Preferably, at least a portion of the second overhead stream in its vapor phase is removed from the second fractionating column and is directed to the first fractionating column. This portion of the second overhead in vapor phase can be used to provide a portion of the heat required in the first fractionating column. The second overhead fraction can be fed to the first fractionating column at any point or feed location along the first fractionating column. The second overhead fraction can be fed to the upper, middle, or lower zone of the first column. Preferably, the second overhead fraction is fed to the first fractionating column at a feed location below the reflux feed point to the first fractionating column and a location above where the vapor outlet of the reboiler of the first fractionating column feeds into the first fractionating column lower zone, even though the second overhead can be fed to the vapor outlet of the reboiler of the first column. Most preferably, the second overhead fraction is fed to the first fractionating column in the stripping zone of the first fractionating column. The term "stripping zone" as used herein refers to that portion of the first fractionating column wherein separation of components of the feed stream to the first fractionating column occurs. The stripping section of a column preferably does not include zones of the column containing only one component of the feed stream to the column.

In one variation of this embodiment, the first sidedraw fraction or side stream of the first fractionating column is removed from the first fractionating column at a point or location along the first fractionating column above the location along the first fractionating column where the second overhead fraction from the second fractionating column is fed to the first fractionating column.

The first side draw stream of the first fractionating column is preferably contaminant free. The first side draw stream comprises substantially the liquid to be purified in its purified form. The first side stream can be cooled. A portion of the cooled first side stream from the first fractionating column can be passed to the second fractionating column as a reflux-type stream. The term "reflux-type stream" as used herein refers to a substitute reflux stream, as reflux streams are generally derived from the fractionating column into which the reflux stream is fed and not from a different fractionating column. The reflux-type stream serves the same function as a reflux stream. Preferably, the first sidedraw fraction passed to the second fractionating column as a reflux-type stream is cooled only slightly below the bubble point of the liquid to be purified. Most preferably, the first sidedraw fraction is cooled to a temperature in the range of about 1–4° C. below the bubble point of the liquid to be purified.

A portion of the first side stream of the first fractionating column which comprises substantially purified liquid can be recovered as purified liquid product. Preferably, the portion recovered as purified liquid product is cooled to a temperature suitable for desired end use or storage, which temperature can be substantially below the bubble point of the liquid to be purified.

The following specific embodiment or description is directed to the purification of a hydrocarbon. Those skilled in the art understand that this invention is applicable to purification of various types of liquids and will not read the following description in an unduly limiting manner.

Thus, in another embodiment of this invention, a process stream containing a hydrocarbon to be purified and an undesired contaminant such as water, polymer, catalyst residue, and polymerization reaction by-products is fed to a first fractionating column where the contaminated stream is fractionated to provide a first substantially hydrocarbon free fraction and a first substantially hydrocarbon enriched fraction. Undesired contaminants which have a boiling point lower than or volatility greater than that of the hydrocarbon to be purified pass overhead from the first fractionating column. The overhead product stream is preferably substantially hydrocarbon free.

The bottoms stream of the first fractionating column is preferably a hydrocarbon enriched, contaminated fraction containing hydrocarbon, and contaminants like soluble and insoluble polymeric material, catalyst residue, polymerization reaction by-products, and the like which have boiling points greater than or equal to or volatility less than the hydrocarbon. This contaminated stream is then fed to a second fractionating column, where this contaminated stream is fractionated to give a second substantially hydrocarbon free fraction and a second substantially hydrocarbon enriched fraction. The kettle product of the second fractionating column which is substantially hydrocarbon free contains a higher concentration of polymeric material, catalytic residue, polymerization reaction by-products, and other contaminants. The kettle product of the second fractionating column which is substantially hydrocarbon free can be discarded without causing a loss of hydrocarbon. The overhead fraction of the second fractionating column is preferably relatively hydrocarbon rich. This fraction is preferably returned to the first fractionating column in vapor form to provide part of the heat input and boil-up for the first fractionating column. This vapor stream fed from the second fractionating column to the first fractionating column can also aid in the dissolution of entrained water, etc. present in the first fractionating column which would increase the vapor load on the first fractionating column and decrease the purity of the hydrocarbon recovered from the first fractionating column.

Preferably at a point above where the overhead fraction from the second fractionating column is fed into the first fractionating column, a hydrocarbon rich vapor side draw can be taken from the first fractionating column. This stream is preferably subcooled slightly and can be used in part as a reflux-type stream for the second fractionating column to control the temperature in upper portion of the second fractionating column. This side draw stream is preferably hydrocarbon rich and virtually contaminant free. A portion of this side draw can be thus recovered as the purified hydrocarbon product. A hydrocarbon purified in this manner is suitable for recycle as a diluent in a polymerization system or is suitable for other chemical uses requiring an anhydrous or high purity liquid.

In another embodiment of this invention, a method of controlling the total energy input to a first fractionating column utilizes a process stream from a second fractionating column. The energy input to the reboiler of the first fractionating column can be set at or near a constant value. For instance, if the reboiler of the column is a steam-heated shell-tube heat exchanger, and the flow rate, quality, etc. of the steam to the reboiler can be held at or near a constant value, the reboiler of the first fractionating column then can vaporize a specific amount of the contents of the first fractionating column and can provide a specific boil-up for a given column feed stream feed rate.

If the composition, temperature etc. of the feed stream to the first fractionating column changes, then the load on the column also changes. The term "load" refers to the total energy required to boilup to the column. If the change in load to the column is not compensated for by a change in the energy input or boil-up, i.e. reduced energy input for a reduced column load and increased energy input for an increased column load, then the column can be unstable or the desired degree of separation and/or purification does not occur in the column.

It is advantageous to add a vapor stream to the first fractionating column to control the column instead of increasing energy input to the column reboiler.

A change in energy fed to a reboiler, i.e. an increase or decrease in the flow rate of heating medium such as steam to the reboiler does not result in an instantaneous increase or decrease in the vapor in the effluent of the reboiler. The reboiler and the column can have time constants or lags in response. Thus, a change in the vapor flow rate exiting a reboiler does not have an instantaneous effect on the vapor loading in all zones of the fractionating column.

A vapor stream can be added to the fractionating column to advantageously control the column by adjusting the vapor loading in a specific portion of the column. A vapor feed to the fractionating column can give fast response and can allow rapid adjustments of column loading to prevent column instability and improper recovery or purification and the like due to load changes.

The vapor stream fed to the first fractionating column can be obtained from a second fractionating column. Preferably, the vapor control stream is added to the stripping section of the first fractionating column which is being controlled by the vapor from a second column.

In still another embodiment of this invention, an apparatus for controlling a first fractionating column is provided. The apparatus comprises a second fractionating column having a vapor effluent stream. A conduit means in communication with the first fractionating column and the second fractionating column can pass the vapor effluent stream from the second fractionating column to the first fractionating column.

Preferably the first fractionating column has an energy input means such as a reboiler, calandria, heat exchanger, and the like, which has a substantially constant energy output to the first column. The energy input means can provide a near constant energy input to the first column. The total energy input to the first column can be controlled and is preferably the sum of the near constant energy input from the energy input means and a variable, controlling energy input which is the vapor effluent stream from the second fractionating column.

A measuring means can measure the value of a process parameter of the vapor effluent stream from the second fractionating column such as flow rate, temperature, and pressure. The measuring means can generate a measurement output or output signal that is representative of the value of the process parameter of the vapor effluent stream. The measuring means can thus sense the change in a value of a process parameter and can direct the measurement of the process parameter to a control means. The measuring means can be positioned in the conduit means between the first fractionating column and the second fractionating column.

A control means can be operatively connected to the measuring means and can have a control means input signal which is the output signal of the measuring means. The control means can generate an output signal responsive to the control means input signal. Suitable control means include conventional analog controllers having an integral-, proportional-, and/or derivative algorithm or a digital logic unit such as a digital computer or relay configuration having a programmable or fixed control algorithm.

A control device can be operatively connected to the control means and can have a control device input signal which is the output signal of the control means. The control device can manipulate one or more process parameters of the vapor effluent stream in response to the control device input signal from the control means. A control device can be positioned in the conduit means and can adjust the rate of flow of the vapor effluent from the second fractionating column to the first fractionating column. The term "control device" as used herein refers to devices used to manipulate a process stream such as a valve and the like.

Preferably, the measuring means measures the flow rate of the vapor effluent stream and the control means and the control device regulate the flow rate of the vapor effluent stream from the second fractionating column to the first fractionating column in response to the measurement output of the measuring means to control the energy input into the first fractionating column.

In one variation of this embodiment, an apparatus for controlling the energy input and boil-up of the first fractionating column having a vapor input stream comprises a pressure measuring means for measuring the pressure in the upper zone of the first fractionating column and for measuring the pressure in the lower zone of the first fractionating column. The term "vapor input stream" as used herein refers to a vapor stream which is derived from vapor generating source other than a reboiler of the first fractionating column. A vapor input stream can be a partially-condensed or a non-condensed vapor stream from a second fractionating column. The first column can have other energy or vapor sources such as a reboiler.

The pressure measuring means can generate an output signal representative of the difference between the pressure in the lower zone and the pressure in the upper zone of the fractionating column represents the differential pressure across the column. The column differential pressure can indicate the energy input to and boil-up of the column. The energy input to the column can be controlled by controlling the boil-up. The output signal from the pressure measuring means can be directed to a control means.

A control means can be operatively connected to the pressure measuring means and can have a control means input signal which is the output of the pressure measuring means. The control means can generate an output signal responsive to the control means input signal.

A control device can be operatively connected to the control means and can have a control device input signal which is the output signal of the control means. The control device can manipulate the vapor input stream responsive to the control device input signal. The control device can be positioned in a conduit which interconnects a first fractionating column with a second fractionating column and passes a vapor stream from the second to the first column. The control device can regulate the rate of flow of the vapor input stream from the second to the first column.

In still another embodiment of this invention, the temperature of the upper zone of a second fractionating column having no reflux stream is controlled by a stream from a first fractionating column. A stream from a first fractionating column can be withdrawn substantially as a vapor. The stream so withdrawn from the first fractionating column can be condensed and at least a portion of the condensed stream from the first fractionating column can be fed to the upper zone of the second fractionating column to control the temperature of the upper zone of the second fractionating column at a desired value.

In another embodiment of this invention, apparatus for controlling the temperature of the upper zone of a second fractionating column having no reflux stream comprises a first fractionating column. The first fractionating column can have a vapor effluent side draw stream which passes in a conduit means to the second fractionating column. A condensing means can be positioned in the conduit means. The condensing means is preferably suitable for condensing at least a portion of the vapor effluent from the first fractionating column to form a condensed vapor. At least a portion of the condensed vapor can be passed to the second column. A temperature measuring means can generate an output signal representative of the temperature in the upper zone of the second column. The temperature measuring means can be positioned in the upper zone of the second fractionating column.

A control means can be operatively connected to the temperature measuring means and can have a control means input signal which is the output signal of the temperature measuring means. The control means can generate an output signal responsive to the control means input signal.

A control device can be operatively connected to the control means and can have a control device input signal which is the output signal of the control means. The control device can manipulate the rate of flow of condensed vapor which is passed from the first to the second column. The control means can thus adjust the control device in response to the temperature measurement of the first column and can control the flow rate of condensed vapor into the second fractionating column.

In still another embodiment of this invention, a process to produce a coupled copolymer includes a liquid purification step. The polymerization process is carried out in the presence of a diluent, which is the liquid to be purified. Suitable diluents can include aromatic, paraffinic, and cycloparaffinic hydrocarbon and mixtures thereof. Specific examples of suitable diluents include benzene, toluene, xylene, n-butane, isobutane, n-pentane, cyclopentane, cyclohexane, methyl cyclohexane, and the like.

Diluent is fed to a polymerization means such as a polymerization reactor. A polar activator can also be fed to the polymerization means. The polar activator can increase the reaction rate of the polymerization process of this invention but does not deactivate the catalyst used in the reaction. Suitable polar activators include ethers, thioethers, and tertiary amines. Preferable polar activators are dimethyl ether, diethyl ether, tetramethylene oxide (tetrahydrofuran), dioxane, paraldehyde, and the like. The polar activator can be present in an amount and range of about 0 to about 50 parts by weight polar activator to 100 parts by weight diluent.

A first charge of a monovinyl-substituted aromatic hydrocarbon monomer and a first charge of an organolithium initiator are fed to the polymerization means. The first charge of monovinyl-substituted hydrocarbon monomer is contacted with the first charge of organolithium polymerization initiator in the presence of a diluent in the polar activator under polymerization conditions for a period of time sufficient to polymerize substantially all of the first charge of monovinyl-substituted hydrocarbon monomer to form a first polymerization reaction product in the polymerization means.

A second charge of a monovinyl-substituted aromatic hydrocarbon monomer and a second charge of an organolithium initiator are then fed to the polymerization means. The second charge of monovinyl-substituted hydrocarbon monomers is contacted with the second charge of organolithium polymerization initiator in the presence of the diluent, the polar activator, and the first polymerization reaction product under polymerization conditions for a period of time sufficient to polymerize substantially all of the second charge of monovinyl-substituted hydrocarbon monomer to form a second polymerization reaction product in contact with the first polymerization reaction product in the polymerization means.

A third charge of a monovinyl-substituted aromatic hydrocarbon monomer and a third charge of an organolithium initiator is then fed to the polymerization means. The third charge of the monomer and initiator can be in one or more increments; that is, the third charge can be broken down into more than one charge resulting in a fourth, fifth, etc. charge. The third charge of monovinyl-substituted hydrocarbon monomer is contacted with the third charge of organolithium polymerization initiator in the presence of the diluent, the polar activator, the first polymerization reaction product, and the second polymerization reaction product under polymerization conditions for a period of time sufficient to polymerize substantially all of the third charge of monovinyl-substituted hydrocarbon monomer to form a third polymerization reaction product in contact with the first and second polymerization reaction products in the polymerization means.

A conjugated diene monomer preferably is then fed to the polymerization means. Substantially all of the conjugated diene monomer can be polymerized in the polymerization means in the presence of the diluent, the polar activator, and the first, second, and third polymerization reaction products to form an additional polymerization reaction product which is a block copolymer.

Then a polyfunctional coupling treating agent can be fed to the polymerization means and interacts with the block copolymer to form a branched block coupled copolymer having branches radiating from a nucleus formed by the polyfunctional treating agent. The branches comprise the polymerization products of the monovinyl-substituted hydrocarbon monomer and the conjugated diene monomer.

The first charge of monovinyl-substituted aromatic hydrocarbon monomer is preferably employed in an amount to provide from about 40–90 weight percent of the total monovinyl-substituted aromatic hydrocarbon monomer employed in preparing the coupled copolymer. The first charge of organolithium polymerization initiator is preferably employed in an amount to provide from about 0.01–0.2 parts by weight above the first charge of initiator per 100 parts by weight of the first charge of the monovinyl-substituted aromatic hydrocarbon monomer.

The second and third charges of monovinyl-substituted aromatic hydrocarbon monomer are preferably employed in an amount to provide from about 10–60 weight percent of the total monovinyl-substituted aromatic hydrocarbon monomer employed in preparing the coupled copolymer. For each of the second and third charges of monovinyl-substituted aromatic hydrocarbon monomer, the second and third charges of organolithium initiator is preferably employed in amount from about 0.1–1.5 parts by weight of each subsequent charge of initiator per each per hundred parts by weight of each subsequent incremental charge of monovinyl-substituted aromatic hydrocarbon monomer. Preferably, the amount of initiator employed in the second or third charge exceeds the amount of initiator employed in the first charge by at least 0.1 part of initiator per hundred parts of monomer by weight.

The total amount of the monovinyl-substituted aromatic hydrocarbon monomer employed in the first three charges to the polymerization means preferably comprises from about 70–95 weight percent of the total weight of the coupled copolymer based upon total weight of all the monomers employed. Preferably the amount of the conjugated diene monomer employed comprises from about 30–5 weight percent of the total weight of the coupled copolymer based upon the total weight of all the monomers employed.

A coupled copolymer is thus so formed in the presence of the diluent by use of the polyfunctional coupling treating agent. A polyfunctional treating agent capable of reacting with the end groups of the block copolymer formed as described above consists of those coupling agents described in U.S. Pat. No. 3,801,520. Preferably the polyfunctional coupling treating agent used herein is an epoxidized unsaturated oil such as epoxidized soy bean oil, epoxidized linseed oil and the like.

The branched block coupled copolymer so formed is then preferably contacted with one or more finishing compounds in the presence of the diluent and/or the polar activator to form a finished branch block coupled copolymer mixture. Preferred treating agents are carbon dioxide and water. One or more finishing compounds like water and $CO_2$ can be added in the same or different process steps. Preferably at least one of the finishing compounds contact the copolymer prior to the addition of any phenolic type antioxidant.

The finished branched block coupled copolymer mixture can then be heated to form a finished branch block copolymer having a reduced content of diluent and to form a vapor feed stream to a liquid purification system. The vapor feedstream comprises diluent, polar compound, and/or finishing compound and other compounds present in the copolymer mixture having a volatility lower than that of the coupled copolymer. The vapor feedstream may also contain entrained or soluble polymer such as dimers, trimers and the like.

The finished branched block coupled copolymer can be recovered by suitable recovery means such as thin film evaporation, extrusion, and other conventional methods of polymer recovery.

An additive selected from the group consisting of an antioxidant, a pigment, and a filler is preferably added to the branched block coupled copolymer mixture in the presence of the diluent or polar activator, after the copolymer has been contacted with at least one finishing compound.

The liquid containing feedstream comprising diluent can be passed to a first fractionating column. In this process, the diluent is the liquid to be purified and a finishing compound, a polymeric solid, or the like is a contaminant with respect to the diluent which is the liquid to be purified. In the first fractionating column, the feedstream is separated into a first overhead fraction, a first side draw fraction, and a first bottom fraction. The first overhead fraction comprising a contaminant having a volatility greater than that of the diluent can be removed from the first fractionating column. For instance, if cyclohexane is the diluent and water is a finishing compound, and water is a contaminant which can be removed in the first overhead fraction from the first fractionating column.

The first bottom fraction of the first fractionating column is fed to a second fractionating column. This first bottom fraction comprises a contaminant having volatility less than or equal to the volatility of the liquid to be purified and comprises a portion of the liquid to be purified. For instance, if the diluent is cyclohexane, and the diluent is contaminated by solid polymeric materials such as dimers or trimers then both the diluent and the solid contaminants would be passed to the second fractionating column.

In the second fractionating column, the first bottom fraction of the first fractionating column is separated into a second overhead fraction and a second bottom fraction. The second bottom fraction comprises substantially a contaminant. In the second fractionating column, the diluent is preferably substantially vaporized leaving essentially only the contaminant having a volatility less than that of the diluent in the second bottom fraction of the second fractionating column. The second bottom fraction is preferably removed from the process and is directed to suitable end use or is discarded.

The second overhead fraction of the second fractionating column comprises substantially diluent in a vapor phase. A second overhead stream obtained in the second fractionating column can be passed to the first fractionating column to provide a portion of the heat required in the first fractionating column.

Preferably at a point above where the second overhead stream is fed into the first fractionating column, the first side draw fraction is removed from the first fractionating column. The first side draw fraction comprises substantially diluent, free of any contaminant. The first side draw fraction which has been removed from the first fractionating column can then be cooled. A portion of the cooled side draw fraction can be passed to the second fractionating column as a reflux-type stream. A portion of the cooled side draw fraction can be recovered as purified liquid diluent. The purified liquid diluent so recovered is suitable for recycle and reuse in the polymerization reaction which is used to produce a coupled copolymer.

The invention is illustrated further with reference to the drawing wherein for purpose of illustration it being understood that this invention is not limited thereto:

FIG. 1 is a diagrammatical arrangement of a liquid purification process of this invention utilized in conjunction with a polymerization process.

Fresh, purified diluent in conduit 20 passes via conduit 21 into a polymerization means 10. The diluent can be contaminated during the subsequent processes involved in the polymerization reaction, polymer recovery and the like. The diluent should be purified before reuse in the polymerization process and the diluent is the liquid to be purified in this embodiment.

A polar activator can pass via conduit 22 to the polymerization means 10. A first charge of a monovinyl-substituted aromatic hydrocarbon monomer can pass via conduit 23 to the polymerization means. A first charge of a polymerization initiator can pass via conduit 24 to the polymerization means. The polymerization means can be set at conditions temperature, pressure, and mixing conducive to the polymerization of substantially all of the first charge of monomer in the presence of the diluent, polar activator, and initiator to form a first polymerization reaction product.

A second charge of a monovinyl-substituted aromatic hydrocarbon monomer can pass via conduit 23 to the polymerization means 10. A second charge of a polymerization initiator can pass via conduit 24 to the polymerization means 10. Conditions of the polymerization means 10 can be set such that the second charge of monomer is substantially completely polymerized in the presence of the diluent, polar activator, initiator, and first polymerization reaction product to form a second polymerization reaction product in the presence of the first reaction product.

A third charge of monovinyl-substituted aromatic hydrocarbon monomer can pass via conduit 23 to the polymerization means 10. A third charge of initiator can likewise pass via conduit 24 to the polymerization means 10. The polymerization means can be operated at conditions conducive to the substantial polymerization of all the monomer to form a third polymerization reaction product in the presence of the diluent, polar activator, initiator, first and second polymerization reaction products.

A conjugated diene monomer can pass via conduit 25 to the polymerization means 10. Polymerization means 10 can be operated at conditions conducive to the formation of a copolymer polymerization product in the presence of a diluent, polar activator, first, second, and third polymerization reaction products.

A polyfunctional coupling agent can be added to the polymerization means 10 via conduit numeral 26. The polymerization means can be operated such that a branched coupled copolymer is formed in the presence of the diluent and polar activator.

Preferably substantially all the contents of the polymerization means 10 pass via conduit 30 to finishing means 12. A first finishing reagent such as water can be added via conduit 27 to the finishing means 12. Simultaneously or subsequently, a second finishing compound such as carbon dioxide can pass via conduit 28 to the finishing means 12. Preferably, at least one of the finishing compounds acts as a polymerization initiator deactivating agent. The finishing means 12 can be operated under conditions such that a portion of the excess diluent, polar activator, and finishing compound can flash or vaporize and pass from the finishing means via conduit 31. Some low molecular weight polymeric material like dimers or trimers can also vaporize and pass via conduit 31 from the finishing means 12. Also, a portion of the excess diluent, polar compound, finishing compound, and the like can be withdrawn by a pump means (not shown) from the finishing means 12 via conduit 31.

At least a portion of the contents of the finishing means 12 comprising the coupled copolymer and some diluent, polar activator, and finishing compound passes via conduit 32 to mixing means 14. Various additives can be added via conduit 29 to the mixing means 14. Additives such as antioxidants and fillers, can be blended with the coupled copolymer in the mixing means 12 in the presence of some diluent, polar activator, and/or finishing compound. The mixing means 14 can be operated such that a portion of the excess diluent, polar activator, and/or finishing compound can pass from the mixing means 14 via conduit 33. Also, the mixing means 14 can be operated under conditions such that a portion of the diluent, polar activator, finishing compound, and/or additive can flash or vaporize and pass from the mixing means 14 via conduit 33.

The coupled copolymer and at least some diluent, polar activator, finishing compound, and/or additive passes via conduit 34 in contact with heat exchange device 16, which can be a shell-tube type heat exchanger. A heat transfer medium such as steam can pass in contact with the heat transfer device 16 and increase the temperature of the mixture of copolymer, diluent activator, finishing compound and additive to form a heated mixture.

The heated mixture from the heat transfer device 16 can pass via conduit 36 to a concentration means 18. The concentration means 18 is preferably operated under conditions conducive to the removing of excess diluent, polar activator, finishing compound, and/or additive from the coupled copolymer. The concentration means 18 can be a high surface area thin filmed evaporator, a heated stirred tank reactor, and the like. The concentration means can be operated under a vacuum. A process stream comprising substantially diluent, polar activator, and finishing compound pass from the concentration means 18 via conduit 35.

A process stream comprising substantially coupled copolymer and having a reduced content of diluent passes from the concentration means 18 via conduit 38 to a polymer recovery means 19. The polymer recovery means 19 can be an extrusion means, a pump means, and the like whereby excess diluent, activator, finishing compound and additive can be removed from the coupled copolymer and passed from the polymer recovery means via conduit 37. Coupled copolymer passes from the polymer recovery means 19 via conduit 40 having a substantially reduced content of diluent, polar activator, and/or finishing compound. Preferably, the coupled copolymer in conduit 40 contains substantially no diluent.

A process stream in conduit 31, 33, 35, and/or 37 can pass via conduit 39 to a first fractionating column 50. The process stream in conduit 39 comprises diluent and one or more contaminants. Diluent is the liquid to be purified and contaminants can include one or more finishing compounds such as water, can include an excess additive, and can include polymeric solids such as low molecular weight polymeric material which was entrained or vaporized into the process stream from any of the process vessels such as the finishing means 12, mixing means 14, concentration means 18, and polymer recovery means 19.

The feedstream to the first fractionating column thus comprises contaminated diluent in conduit 39. In the first fractionating column, the feedstream is separated into a first overhead fraction, a first side draw fraction, and a first bottom fraction. The first overhead fraction in the first fractionating column 50 comprises substantially a contaminant having a volatility less than that of the liquid to be purified. For instance, if a liquid to be purified is cyclohexane and water was used as a finishing compound, then water would be one component of the first overhead fraction since water has a volatility greater than that of the diluent, cyclohexane. The first overhead fraction passes from the first fractionating column 50 via conduit 60 and can pass in contact with a heat exchange device 62 wherein the contaminant-enriched stream is condensed and passed to a storage means 64 such as an accumulator. A portion of the diluent can be entrained or included in the first overhead fraction. So, it is preferable to use the storage means 64 as a decanting means. In the storage means 64, two layers can be formed. A contaminant-enriched layer such as water can pass from the storage means 64 via conduit 69. The contaminant can be directed to other uses or can be discarded.

A portion of the contents of the storage means 64 can pass via conduit 66 to the first fractionating column 50 as a reflux stream. The process stream in conduit 66 can contain diluent or contaminant or both. Portion of the process stream in conduit 66 can be removed from the process via conduit 68 if desired. Since the first column 50 can be operated under pressure, a pump means 67 can be used to pressurize and feed the reflux to the first column.

The first bottom fraction of the first fractionating column 50 can pass via conduit 52 in contact with a heat exchange means 54. A heat exchange means 54 can be a reboiler and a portion of the first bottom fraction in conduit 52 can exit the heat exchange device 54 in substantially vapor form and pass via conduit 56 back to the first fractionating column 50. The stream in conduit 56 can provide at least a portion of the energy required to boil-up the first column.

The first bottom fraction preferably comprises diluent and any contaminant having a volatility less than or equal to the volatility of the diluent.

At least a portion of the first bottom fraction in conduit 52 passes via conduit 58 to a second fractionating column 70. In the second fractionating column 70, the first bottom fraction in conduit 58 of the first fractionating column 50 can be separated into a second overhead fraction and a second bottom fraction. The second bottom fraction of the second fractionating column 70 comprises substantially a contaminant. Since it is desired to remove the contaminant from the process, the second bottom fraction can be directed from the second fractionating column 70 via conduit 72. The contaminant can be directed to other uses or can be discarded.

At least a portion of the second bottom fraction of the second fractionating column can pass via conduit 76 in contact with heat exchange means 77. Heat exchange means 77 can be a reboiler. Thus, a portion of the second bottom fraction in conduit 76 can be vaporized by the heat exchange device 77 and can pass via conduit 75 back into the second fractionating column 70 to provide energy input to the second fractionating column.

The second overhead fraction of the second fractionating column 70 preferably comprises the liquid to be purified. The second overhead fraction can be removed from the second fractionating column 70 in substantially a vapor phase and can be directed via conduit 90 to the first fractionating column 50 to provide a portion of the heat required in the first fractionating column. The second overhead fraction 90 can be fed to the first fractionating column 50 in the lower zone of the first column, such as in the reboiler effluent conduit 56. Preferably, the second overhead fraction is fed to the middle zone of the first column.

A first pressure measuring means 91 can measure the pressure in the upper zone of the first fractionating column 50. A second pressure measuring means 92 can measure the pressure in the lower zone of the first fractionating column 50. The difference in pressure across the first column 50 measured by measuring means 91 and 92 can indicate the relative boil-up or energy input to the first fractionating column 50. The measurement signal or outputs from the pressure measuring means 91 and 92 can be directed to a control means 93. The control means 98 can adjust control device 96 in response to the differential pressure across at least a portion of the first fractionating column 50. Control device 96 which is positioned in conduit means 90 which interconnects the first and second column can adjust the rate of flow of vapor in the conduit means 90 that flows from the first to the second column. If differential pressure across the column increases, then control means 93 can direct control device 96 to at least partially close to reduce the flow rate of vapor in conduit 90 to the first fractionating column 50. This will reduce the boil-up in the first fractionating column. If the differential pressure across the column is relatively low, control of means 93 can direct control device 96 to at least partially open to increase the vapor flow rate in conduit 90 to the first fractionating column 50.

The output from the control means 93 can optionally be directed to a second control means 98. A flow sensing means 97 can be positioned in conduit 90 to sense the rate of flow of vapor in conduit 90. The output from the flow measuring means 97 can be directed to the second control means 98. In a cascade control arrangement, control means 93 can regulate the set-point of the second control means 98. The output from second control means 98 can control the relative position of control device 96 and regulate the rate of flow in conduit 90 to control the total energy input to the first fractionating column 50.

Preferably in the above control arrangements, the rate of flow of heat transfer medium to heat exchange device 54 is held constant so that the rate of energy input to the first fractionating column from heat exchange device 54 is near a desired value or at a constant value. Thus, the total energy input to the first fractionating column 50 can be controlled by the rate of vapor flow from the second fractionating column 70 to the first fractionating column 50 via conduit 90. Total energy to the first column is preferably the sum of a constant energy input from the reboiler 54 and a variable energy input from the vapor stream in conduit 90 from the second column.

The side draw fraction from the first fractionating column 50 can pass via conduits 80 and 83 to a heat transfer means 84. A relatively cool heat transfer medium can pass in contact with heat exchange device 84 so that at least a portion of the side draw fraction in conduit 83 is condensed. Preferably, the side draw fraction in conduit 83 is condensed only slightly below the bubble point of the side draw fraction. The cooled side draw fraction can pass via conduit 83 by a pump means 85 to the second fractionating column 70. Gravity flow can also be used depending on second column operating processes. An accumulator (not shown) can be positioned in conduit 83 to allow storage or flow regulation of the cooled sidedraw fraction.

Preferably, the cooled side draw fraction from the first fractionating column is added to the upper zone of the second fractionating column as a reflux-type stream. Also, the rate of flow of the reflux-type stream of the second fractionating column 70 is preferably controlled. Most preferably, the rate of flow of the reflux-stream to the second column is controlled in response to the temperature in the upper zone of the second fractionating column 70. A temperature measuring means 73 can sense the temperature in the upper zone of the second fractionating column 70. The output of the temperature measuring means 73 can be directed to a control means 74. Control means 74 can adjust control device 86, which is positioned in conduit 83 and can adjust the rate of flow of the condensed stream into the second column. If the temperature in the upper zone of the second fractionating column 70 is relatively high, then control means 74 can direct control device 86 to at least partially increase or open. This can increase the rate of flow of the reflux-type stream in conduit 83 from the first fractionating column 50 to the second fractionating column 70. If the temperature in the upper zone of the second column 70 is relatively low, then the control means 74 can direct the control device 86 to at least partially close and can reduce the rate of flow to the reflux-type stream in conduit 83 to the second column 70.

Preferably the output of the control means 74 is directed to second control means 88. A process parameter such as flow rate of the reflux-type stream in conduit 83 can be measured by measuring means 87. The output measurement of measuring means 87 can be directed to the second control means 88. In a cascade-type control arrangement, the output from control means 74 can adjust the set-point of control means 88. Control means 88 can adjust or control the relative position of control device 86 in response to the process parameter measurement 87 to achieve a desired or set-point condition in the upper zone of the second fractionating column 70.

Preferably, the side draw fraction from the first fractionating column 50 is taken from the first fractionating column at a point where the side draw fraction comprises substantially diluent. At least a portion of the side draw fraction in conduit 80 can be directed via conduit 81 to a heat exchange device 82. The side draw fraction in conduit 81 can be cooled by heat exchange device 82 and can pass via conduit 21 as recycle diluent to the polymerization means 10. A portion of the cooled, purified diluent in conduit 81 can pass via conduit 89 to other process use or to storage for later use in the polymerization process.

The following examples are intended to further illustrate the invention without undue limitation of scope.

CALCULATED EXAMPLE I

A 1000 Kg/hour contaminated feed stream at 38° C. and atmospheric pressure is fed to a first fractionating column. The feed stream comprises 100 parts by weight hydrocarbon to be purified and recovered, which is cyclohexane in this example, and 0.2 to 2 parts by weight contaminants. Low boiling contaminants (i.e. low boiling relative to the hydrocarbon to be purified and recovered) include water and light hydrocarbons such as ethane or butane which can be dissolved in a hydrocarbon to be purified and recovered. Higher boiling contaminants include ethyl benzene, styrene, and the like. Solid polymeric contaminants such as butadiene-styrene copolymers or polyethylene polymers are also present.

The first fractionating column has twenty-six theoretical trays having a tray efficiency in the range of about 40–80 percent. The bottom of the first fractionating column is controlled at 118° C. and 260 KPa (kilopascals). A column reflux ratio of 0.405 Kg of reflux per Kg of feedstream is used for the first fractionating column. The overhead of the first fractionating column is set at 104° C. and 240 kilopascals. The storage means or accumulator of the overhead of the first fractionating column and the low-boiling effluent overhead stream which is purged from the process are maintained at 38° C. and atmospheric pressure.

In this example, a side draw fraction comprising substantially the liquid to be purified is taken from the middle zone of the first column at 117° C. and 250 kilopascals. This side stream is condensed to 38° C. and atmospheric pressure. The condensed side stream is recovered as high purity product, i.e. hydrocarbon containing essentially no contaminants.

With such column design and operating conditions, calculated hydrocarbon losses in the column kettle product would be in the range of about 2 to 4 parts by weight hydrocarbon lost in the discarded contaminated kettle product of this first column per 100 parts by weight of total hydrocarbon fed to this first column.

CALCULATED EXAMPLE II

In this example, a first fractionating column which has the same contaminated feed stream, column design, operating conditions, etc., as the first fractionating column in Example I is used. In this example, however, a second fractionating column is used in conjunction with the first fractionating column.

The second fractionating column contains twenty-five theoretical trays having a tray efficiency in the range of about 50–80 percent. The feed stream to the second column is at least a portion of the bottom fraction of the first fractionating column of Example I, having about 2 to 4 parts by weight hydrocarbon of total hydrocarbon fed to the first column. The stream also contains about 1 part by weight contaminants. The second column has a reboiler, and the bottom of the second column is controlled at 148° C. and 280 kilopascals.

A side stream is taken from the first fractionating column at 117° C. and 250 kilopascals. At least a portion of the side stream is condensed at 38° C. and atmospheric pressure and is recovered as a high purity product, i.e. hydrocarbon containing essentially no contaminants.

Another portion of the side stream is cooled slightly below the bubble point of the liquid to be purified. For cyclohexane, the side stream is cooled to 102° C. and 270 kilopascals. The slightly cooled stream is fed to the upper zone of the second fractionating column where the slightly cooled stream is used as a reflux-type stream for the second column. The upper zone of the second column is controlled at 114° C. and 270 kilopascals by use of the reflux-type stream. A flow of 1.05 Kg of the reflux-type stream per one Kg of feed stream (i.e. a portion of the side draw fraction of the first fractionating column) to the second fractionating column is used.

Under the process conditions described above, by using the two column configuration of this invention, the loss of hydrocarbon, which is measured as hydrocarbon in the kettle product of the second fractionating column, is reduced to 0.2 to 0.4 parts by weight hydrocarbon loss per 100 parts by weight hydrocarbon fed to the first fractionating column.

Also, under this configuration and these operating conditions, the second fractionating column provides about 3 percent of the total energy required to reboil the first fractionating column.

Reasonable variations and modifications which will become apparent to those skilled in the art can be made in this invention without departing from the spirit and scope thereof.

That which is claimed is:

1. A process for purifying a liquid to be purified which contains contaminants, comprising:
   (a) passing a feedstream comprising the liquid to be purified and a contaminant to a first fractionating column,
   (b) separating in said first fractionating column said feedstream into a first overhead fraction, a side draw fraction, and a first bottom fraction,
   (c) removing from said first fractionating column, said first overhead fraction comprising a contaminant having a volatility greater than that of the liquid to be purified,
   (d) feeding to a second fractionating column, said first bottom fraction of the first fractionating column, said first bottom fraction comprising a contaminant having a volatility less than or equal to the volatility of the liquid to be purified and comprising a portion of the liquid to be purified,
   (e) separating in said second fractionating column said first bottom fraction of the first fractionating column into a second overhead fraction and a second bottom fraction
   (f) removing from the process, said second bottom fraction of the second fractionating column comprising substantially a contaminant,
   (g) removing from said second fractionating column, said second overhead fraction comprising the liquid to be purified in a vapor phase,
   (h) feeding said second overhead stream into the first fractionating column to provide a portion of the heat required in said first fractionating column,
   (i) removing from the first fractionating column, at a point above where said second overhead stream is fed into the first fractionating column, said side stream fraction of the first fractionating column comprising the liquid purified of contaminant,
   (j) cooling said side draw fraction which has been removed from the first fractionating column,
   (k) passing a portion of the cooled side draw fraction to the second fractionating column as a reflux-type stream,
   (l) recovering a portion of the cooled side draw fraction as purified liquid product.

2. A process in accordance with claim 1 wherein the liquid to be purified is a diluent from a polymerization process and wherein the contaminants include insoluble and or soluble polymer.

3. A process in accordance with claim 2 wherein said diluent is a hydrocarbon diluent and said polymer is a hydrocarbon polymer.

4. A process in accordance with claim 1 wherein the contaminants include water.

5. A process in accordance with claim 1 wherein the contaminants include a metallic catalyst residue.

6. A process in accordance with claim 1 wherein the contaminants include a hydrocarbon.

7. A method of controlling the total energy input to a fractionating column having a reboiler comprising,
   (a) establishing a constant energy input to the reboiler of the fractionating column
   (b) manipulating a vapor input stream added to the fractionating column.

8. A method in accordance with claim 7 wherein said vapor input stream to the fractionating column is obtained from a second fractionating column.

9. A method in accordance with claim 7 wherein said vapor input stream is added to the stripping section of the fractionating column.

10. A method of controlling the temperature of the upper zone of a second fractionating column having no reflux stream, comprising:
   (a) withdrawing a stream from a first fractionating column which is substantially a vapor,
   (b) condensing said stream withdrawn from said first fractionating column, and
   (c) feeding at least a portion of said condensed stream from said first fractionating column to the upper zone of said second fractionating column to control the temperature of the upper zone of said fractionating column at a desired value.

11. A process to produce a coupled copolymer comprising:
   (a) feeding a diluent to a polymerization means,
   (b) feeding a polar activator to said polymerization means,
   (c) feeding a first charge of a monovinyl-substituted aromatic hydrocarbon monomer and a first charge of an organolithium initiator to said polymerization means,
   (d) contacting said first charge of monovinyl-substituted aromatic hydrocarbon monomer with said first charge of organolithium polymerization initiator in the presence of said diluent and said polar activator under polymerization conditions for a period of time sufficient to polymerize substantially all of said first charge of monovinyl-substituted aromatic hydrocarbon monomer to form a first polymerization reaction product in said polymerization means, (e) feeding a second charge of a monovinyl-substituted aromatic hydrocarbon monomer and a second charge of an organolithium initiator to said polymerization means, (f) contacting said second charge of monovinyl-substituted aromatic hydrocarbon monomer with said second charge of organolithium polymerization initiator in the presence of said diluent, said polar activator, and said first polymerization reaction product under polymerization conditions for a period of time sufficient to polymerize substantially all of said second charge of monovinyl-substituted aromatic hydrocarbon monomer to form a second polymerization reaction product in the presence of said first reaction polymerization product in said polymerization means, (g) feeding a third charge of a monovinyl-substituted aromatic hydrocarbon monomer and a third charge of an organolithium initiator to said polymerization means, (h) contacting said third charge of monovinyl-substituted aromatic hydrocarbon monomer with said third charge of organolithium polymerization initiator in the presence of said diluent, said polar activator, and said first and second polymerization reaction products under polymerization conditions for a period of time sufficient to polymerize substantially all said third charge of monovinyl-substituted aromatic hydrocarbon monomer to form a third polymerization reaction product in the presence of said first and second polymerization reaction products in said polymerization means (i) feeding a conjugated diene monomer to said polymerization means (j) polymerizing substantially all of said conjugated diene monomer in the presence of said diluent, polar activator, and first, second and third polymerization reaction products to form an additional polymerization reaction product comprising a block copolymer, (k) feeding a polyfunctional coupling treating agent to said polymerization means in contact with said block copolymer to form a branched block coupled copolymer having branches radiating from a nucleus formed by said polyfunctional treating agent, said branches comprising polymerization reaction products of said monovinyl-substituted aromatic hydrocarbon monomer and said conjugated diene monomer, (l) contacting said branched block coupled copolymer with one or more finishing compounds in the presence of said diluent and polar activator to form a finished branch block coupled copolymer mixture, (m) heating said finished branch block coupled copolymer mixture to form a finished branch block coupled copolymer having a reduced content of diluent and a vapor feedstream comprising diluent, polar compound, and finishing compound, (n) recovering said finished branch block coupled copolymer from said finished branch block coupled copolymer mixture, (o) passing said feedstream to a first fractionating column, (p) separating said feedstream in said first fractionating column into a first overhead fraction, a side draw fraction, and a first bottom fraction, (q) removing from said first fractionating column, said first overhead fraction, (r) feeding said first bottom fraction of said first fractionating column to a second fractionating column, (s) separating said first bottom fraction of the first fractionating column in said second fractionating column into a second overhead fraction and a second bottom fraction, (t) removing said second bottom fraction of the second fractionating column from the process, (u) removing said second overhead fraction in vapor phase from said second fractionating column, (v) feeding said second overhead stream into said first fractionating column to provide a portion of the heat required in said first fractionating column, (w) removing from the first fractionating column, at a point above where said second overhead stream is fed into said first fractionating column, said sidedraw fraction of the first fractionating column, (x) cooling said sidedraw fraction which has been removed from the first fractionating column, (y) passing a portion of the cooled sidedraw fraction to the second fractionating column as a reflux-type stream, (z) recovering a portion of the cooled sidedraw fraction as purified diluent, (aa) recycling a portion of the cooled sidedraw fraction to the polymerization means as purified diluent.

12. A process in accordance with claim 11 wherein an additive selected from the group consisting of an antioxidant, a pigment, and a filler is added to said branched block coupled copolymer in the presence of said diluent after said branched block coupled copolymer has been contacted with at least one finishing compound.

* * * * *